United States Patent
Richter et al.

(10) Patent No.: US 7,294,405 B2
(45) Date of Patent: *Nov. 13, 2007

(54) ANTIGLARE COATING AND ARTICLES

(75) Inventors: Paul J. Richter, Chelmsford, MA (US); Darran R. Cairns, Billerica, MA (US); Frank J. Bottari, Acton, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 400 days.

This patent is subject to a terminal disclaimer.

(21) Appl. No.: 10/926,722

(22) Filed: Aug. 26, 2004

(65) Prior Publication Data

US 2006/0046078 A1    Mar. 2, 2006

(51) Int. Cl.
   *B32B 17/06* (2006.01)
(52) U.S. Cl. .................... 428/432; 428/697
(58) Field of Classification Search ............... 428/432, 428/697
   See application file for complete search history.

(56) References Cited

U.S. PATENT DOCUMENTS

| | | | |
|---|---|---|---|
| 2,601,123 A | 6/1952 | Moulton | |
| 4,198,539 A | 4/1980 | Pepper, Jr. | |
| 4,293,734 A | 10/1981 | Pepper, Jr. | |
| 4,371,746 A | 2/1983 | Pepper, Jr. | |
| 4,734,295 A | 3/1988 | Liu | |
| 5,189,337 A | 2/1993 | Endo et al. | |
| 5,639,517 A | 6/1997 | Floch et al. | |
| 5,698,266 A | 12/1997 | Floch et al. | |
| 5,725,957 A | 3/1998 | Varaprasad et al. | |
| 5,742,118 A | 4/1998 | Endo et al. | |
| 5,998,013 A | 12/1999 | Shoshi et al. | |
| 6,106,892 A | 8/2000 | Ye | |
| 6,248,397 B1 | 6/2001 | Ye | |
| 6,280,552 B1 | 8/2001 | Bottari | |
| 6,406,758 B1 | 6/2002 | Bottari | |
| 6,504,582 B1 | 1/2003 | Li et al. | |
| 6,504,583 B2 | 1/2003 | Li et al. | |
| 6,649,266 B1 | 11/2003 | Gross et al. | |
| 6,727,895 B2 | 4/2004 | Bottari et al. | |
| 2004/0027339 A1 | 2/2004 | Schulz | |
| 2004/0040645 A1 | 3/2004 | Bottari | |
| 2004/0071986 A1* | 4/2004 | Shoshi et al. | ............... 428/446 |

FOREIGN PATENT DOCUMENTS

| | | |
|---|---|---|
| EP | 0658525 | 6/1995 |
| EP | 1077236 | 2/2001 |

(Continued)

OTHER PUBLICATIONS

Pending U.S. Appl. No. 10/926,690, filed Aug. 26, 2004.
A New Anti-Static Anti-Reflection Coating for CRTs Using Ultrafine Particles, Kawamura et al., Hitachi, Ltd., Mechanical Engineering Research Laboratory, Ibarahi, Japan, SID 93 Digest, 1993, pp. 209-212.
Sol-Gel Dervied Thick Coatings and their Thermomechanical and Optical Properties; Mennig et al., vol. 1758 Sol-Gel Optics II (1992).

(Continued)

*Primary Examiner*—G. Blackwell
(74) *Attorney, Agent, or Firm*—Carolyn A. Fischer

(57) ABSTRACT

The present invention relates to articles comprising an antiglare layer, coating compositions suitable for making antiglare layers, methods of making an antiglare article, and methods of making antiglare coating compositions. In some embodiments the article is a (e.g. illuminated) display article such as a touch screen. The antiglare layer comprises aggregate inorganic oxide particles in a cured inorganic polymer matrix.

30 Claims, 3 Drawing Sheets

FOREIGN PATENT DOCUMENTS

| | | |
|---|---|---|
| EP | 1167313 | 1/2002 |
| EP | 1 425 352 | 3/2003 |
| JP | 378946 | 4/1991 |
| JP | 474568 | 3/1992 |
| WO | WO 98/45113 | 10/1998 |
| WO | WO 01/53225 | 7/2001 |
| WO | WO 02/094729 | 11/2002 |
| WO | WO 03/022935 | 3/2003 |

OTHER PUBLICATIONS

Effect of the Additives in Sols on the Surface Roughness of the Coating Films Derived from Mixtures of Tetraethoxysilane-and Methyltriethoxysilane-Derived Sols; Akamatsu et al.; Journal of the Ceramic Society of Japan 111[9] 636-639 (2003).

Journal of Non-Crystalline Solids 218 (1997) 163-168; *One step antiglare sol-gel coating for screens by sol-gel techniques*; C. Schelle, et. al.

* cited by examiner ary surfaces of glass substrates. The first method involves depositing an "interference" coating stack on the glass substrate that controls glare by taking advantage of the optical interference within thin films. Such films usually have a thickness of about one-quarter or one-half the nominal wavelength of visible light, depending on the relative indexes of refraction of the coating and glass. The second method involves forming a light scattering, i.e. diffusing, means at the surface of the glass, usually either by altering the characteristics of the outermost surface of the glass substrate or via a diffuser coating on the glass substrate.

ANTIGLARE COATING AND ARTICLES

BACKGROUND

As described in U.S. Pat. No. 5,725,957, there are primarily two methods of reducing glare associated with surfaces of glass substrates. The first method involves depositing an "interference" coating stack on the glass substrate that controls glare by taking advantage of the optical interference within thin films. Such films usually have a thickness of about one-quarter or one-half the nominal wavelength of visible light, depending on the relative indexes of refraction of the coating and glass. The second method involves forming a light scattering, i.e. diffusing, means at the surface of the glass, usually either by altering the characteristics of the outermost surface of the glass substrate or via a diffuser coating on the glass substrate.

Interference coatings reduce glare without reducing resolution. However, they are relatively expensive to deposit, requiring the use of relatively high cost vacuum deposition techniques such as sputtering and precise manufacturing conditions, or very precise alkoxide solution dip coating techniques, with subsequent drying and firing. Strict thickness control and uniformity are required.

In attempting to reduce glare by diffusion of light, one approach has been to etch the outer surface of the glass substrate, or otherwise modify the outer surface of a coating deposited on the glass substrate. There are numerous drawbacks in etching or otherwise modifying the surface characteristics of a substrate or coated substrate. Etching by chemical means involves handling and storage of generally highly corrosive compounds (e.g. hydrofluoric acid). Such compounds create processing and disposal problems in view of increasingly stringent environmental laws. Etching by non-chemical means, such as by sandblasting, necessitates additional and costly processing operations. In U.S. Pat. No. 5,725,957, a transparent substrate is spray coated with a precursor solution formed by dissolving a precursor of an inorganic metal oxide in an organic solvent. As an alternative, another approach has been to incorporate diverse materials (e.g. mixed oxides having different refractive indexes) into coating compositions.

Although various approaches of reducing glare have been described, industry would find advantage in new approaches for providing an antiglare surface.

SUMMARY OF THE INVENTION

In one aspect the invention relates to an article such as a touch screen comprising a glass substrate, an active element for detecting a touch on the touch screen, and an antiglare layer. The antiglare layer comprises aggregate inorganic oxide particles in a cured inorganic polymer matrix wherein the aggregates form surface structures ranging in size from greater than 2 micrometers to about 100 micrometers. The active element may comprise a transparent conductive layer (e.g. comprised of transparent conductive oxide) disposed between the glass substrate and the antiglare layer.

In some embodiments, the (e.g. touch screen) article preferably comprises a silicon oxide layer disposed between the transparent conductive layer and the antiglare layer and/or a liquid crystal silane surface layer.

The (e.g. touch screen) article typically has any one or combination of the following optical properties including a reflected haze of at least 150, a reflectance of less than 10%, and a transmission of at least 80%.

The (e.g. touch screen) article typically has any one or combination of the following durability properties including a scratch resistance as determined by the Nanoscratch Test of at least 10 mN, a Taber Abrasion Resistance test of at least 100 cycles, and a time to failure as determined by the Polishing Test of at least 2 hours for a 1 micrometer antiglare layer.

The inorganic oxide particles typically have a mean particle size ranging from about 0.05 micrometers to about 0.15 micrometers.

The surface structures typically have a dimension of at least 10 micrometers or 20 micrometers. The surface layer has a total surface area and the surface structures comprise at least 20%, at least 30% or at least 40% of the total surface area.

The cured inorganic polymer matrix is typically derived from an organosilane such as a silicon alkoxide. The cured organosilane is typically derived from a sol-gel process.

In other embodiments, the invention relates to a coating composition comprising an organosilane and flocculated inorganic oxide particles ranging in size from greater than 2 micrometers to about 100 micrometers. The inorganic oxide particles are typically present in a concentration of less than 1.5 wt-%.

In another embodiment, the invention relates to a method of making an antiglare article with the coating composition.

In another embodiment, the invention relates to a method of making an antiglare coating composition comprising providing an inorganic polymer precursor and colloidal silica particles having a mean particle size ranging from 0.05 micrometers to 0.15 micrometers; and forming an inorganic polymer solution concurrently with flocculating colloidal silica aggregates having a mean particle size of greater than 2 micrometers.

In another embodiment, the invention relates to a (e.g. touch screen) article comprising an antiglare layer having a synergistic balance of optical properties and durability. The article preferably has a transmitted haze of less than 30% (e.g. less than 20%, 10% or 5%), transmission of at least 80% (e.g. at least 85% or 90%), clarity of at least 70% (e.g. 80%), and a scratch resistance as determined by the Nanoscratch Test of at least 10 mN.

DETAILED DESCRIPTION OF PREFERRED EMBODIMENTS

The present invention relates to articles comprising an antiglare (e.g. surface) layer, coating compositions suitable for making antiglare layers, methods of making an antiglare article, and methods of making antiglare coating compositions. In some embodiments the article is a (e.g. illuminated) display article such as a touch screen.

Various touch screens are known in the art, such as those described in U.S. Pat. Nos. 4,198,539; 4,293,734; and 4,371,746; incorporated herein by reference. Touch screens typically comprise a (e.g. computer) touch sensitive panel such as commercially available from 3M Touch Systems, Inc., Methuen, Mass.

Figure 1:
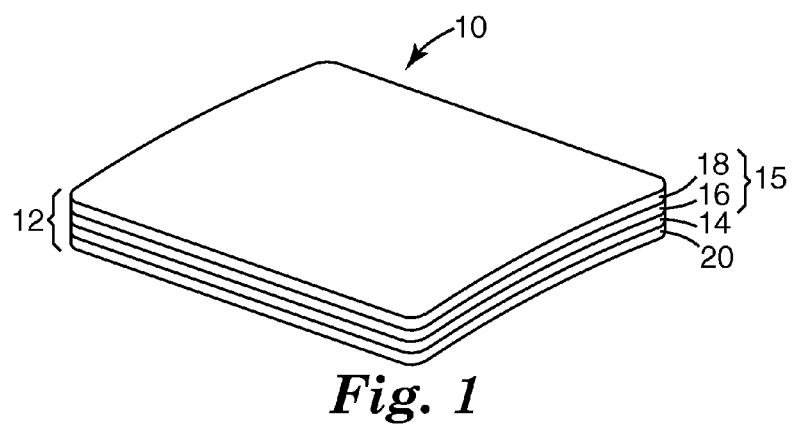
FIG. 1 is a three dimensional view of a touch panel having an antiglare surface layer in accordance with the invention.

One exemplary display 10 of FIG. 1 includes touch panel 12 that includes an insulative substrate 14, such as glass, plastic or another transparent medium and active portion 15 on substrate 14. Active element 15 for detecting a touch input typically includes a transparent conductive layer 16 deposited directly on substrate 14. Layer 16 is typically a doped tin oxide layer having a thickness of twenty to sixty nanometers and may be deposited by sputtering, vacuum deposition and other techniques known in the art. Conductive layer 16 may also include a conductive polymeric material or a conductive organic-inorganic composite. A conductive pattern, (not shown), is typically disposed about the perimeter of conductive layer 16 to provide a uniform electric field throughout conductive layer 16 in order to establish the point of contact between the display and a finger or stylus. Second conductive layer 20 may optionally be provided to shield display 10 from noise that may result from the electric circuits of a display unit, (not shown), to which display 10 may be attached and may similarly include a tin oxide layer deposited in a similar manner as discussed with reference to conductive layer 16. The touch panel includes an antiglare layer 18 in accordance with the invention.

In the article of the invention the antiglare layer may be present as a surface layer, such as depicted in FIG. 1. Alternatively, the antiglare layer is disposed between the surface layer and the substrate. The presence of layers above the antiglare layer does not detract from the structural features, the optical properties, nor the durability properties of the antiglare layer as will subsequently be described.

The antiglare surface layer comprises aggregate inorganic oxide particles in a cured inorganic polymer matrix. The aggregate inorganic oxide particles have a maximum dimension ranging in size from 0.1 micrometers to about 100 micrometers. The aggregate inorganic oxide particles preferably have a maximum dimension of at least 0.2 micrometers and more preferably at least 0.3 micrometers. The discrete inorganic oxide particles that form the aggregates are substantially smaller in size than the surface structures. As used herein, an "aggregate" refers to at least two particles bonded together. The surface structures are comprised of one or more aggregate inorganic oxide particles. Accordingly, the surface structures have a maximum dimension of at least the size of a single aggregate.

Without intending to be bound by theory, by use of a cured inorganic polymer matrix to bind the surface structures, the resulting antiglare surface can advantageously provide a synergistic balance of antiglare optical properties in combination with high levels of durability. Antiglare is typically characterized by a combination of optical properties. Among such optical properties, reflected haze and reflectance are usually most indicative of the antiglare property. The antiglare surface layer described herein generally has a reflectance of less than 10%. The reflected haze is typically at least 150 and more typically at least 200. The reflected haze is usually less than 600 and more typically less than 550. However, the application of an antiglare coating can reduce the transmission, transmitted haze, and clarity. The transmission is generally greater than 80%. Preferably, the transmission is at least 85% and more preferably at least 90% or greater. The transmitted haze of the antiglare surface layer is typically less than 30% and preferably less than 25%. Antiglare surface layers having relatively small surface structures can provide a transmitted haze of about 10%, whereas antiglare surface layers having larger surface structures can provide transmitted haze values of less than 10%. For example, the transmitted haze may be less than 8%, 7% or 6%. The clarity is at least 70% and preferably at least 80%. The test methods for determining such optical properties are described in the forthcoming examples.

In combination with the optical properties just described, the antiglare surface layer also exhibits high levels of durability. For example, the touch screen has a scratch resistance as determined by the Nanoscratch Test of at least 10 mN and preferably of at least 30 mN. Alternatively or in addition thereto, the touch screen has a time to failure as determined by the Polishing Test of at least 2 hours for a 1 micrometer antiglare layer. Alternatively or in addition thereto, the touch screen has Taber Abrasion Resistance of at least 100 cycles with CS-10F abrasive wheels and a load of 500 g. The test methods for determining such durability properties are described in the forthcoming examples.

A variety of colloidal inorganic oxide particles may be employed in the antiglare layer described herein. Suitable inorganic oxides include for example silica, ceria, alumina, zirconia, titania, and mixtures thereof. Silica is a preferred inorganic oxide particle, particularly when used in combination with an organosilane based inorganic polymer matrix.

Figure 2:
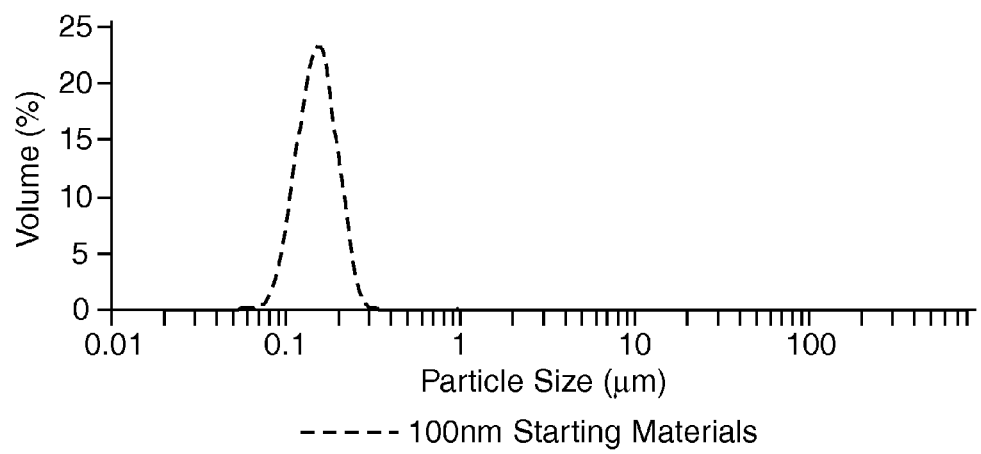
FIG. 2 depicts the particle size distribution of an illustrative colloidal inorganic oxide suitable to be employed for making an antiglare surface layer.

As depicted in FIG. 2, typically, about 95% by weight of the colloidal inorganic oxide particles employed to form the aggregates range in size from 0.005 micrometers to 0.30 micrometers. The starting colloidal inorganic oxide particle distribution may be substantially free of particles having a particle size in excess of 0.30 micrometers. The starting colloidal particles may be substantially larger as well, for example the starting colloidal inorganic oxide particles may have a mean particle size ranging from about 0.005 micrometers to 0.5 micrometers.

Figure 4:
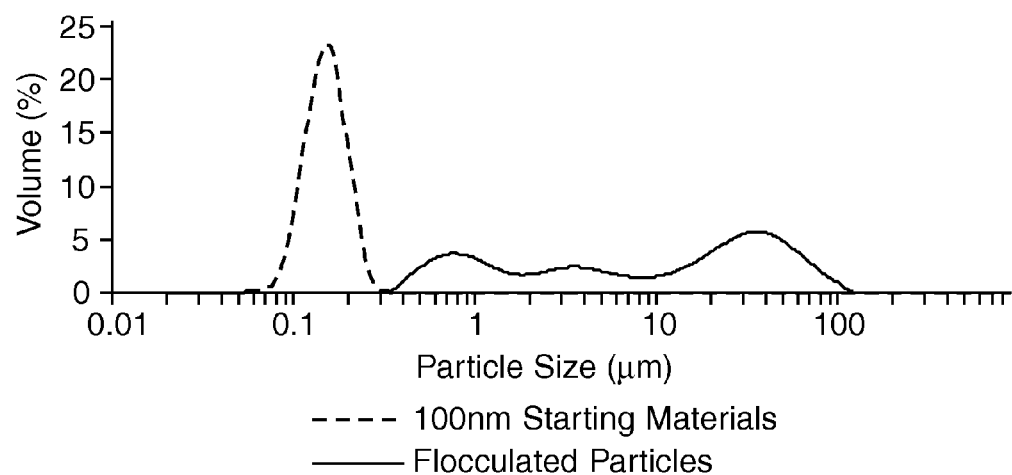
FIG. 4 depicts the particle size distribution of another illustrative coating composition employed for making the antiglare surface.

The Applicant has found that relatively large aggregates can be formed from colloidal (e.g. silica) inorganic oxide having a mean particle size of about 0.15 micrometers (150 nm). In order to obtain such relatively large aggregates, substantially all of the starting colloidal particles may be flocculated into aggregates, as depicted in FIG. 4. The size of the resulting aggregates may range from 0.30 micrometers (e.g. twice the mean particle size of the starting colloidal inorganic oxide particles) to 100 micrometers (i.e. 1000 times the mean particle size of the starting colloidal inorganic oxide particles). It is typically preferred that the aggregate particles have a mean size of at least 2 micrometers and preferably a mean size of less than 40 micrometers. Typically, the size of the aggregates is somewhat evenly distributed throughout the aggregate size range.

Figure 5:
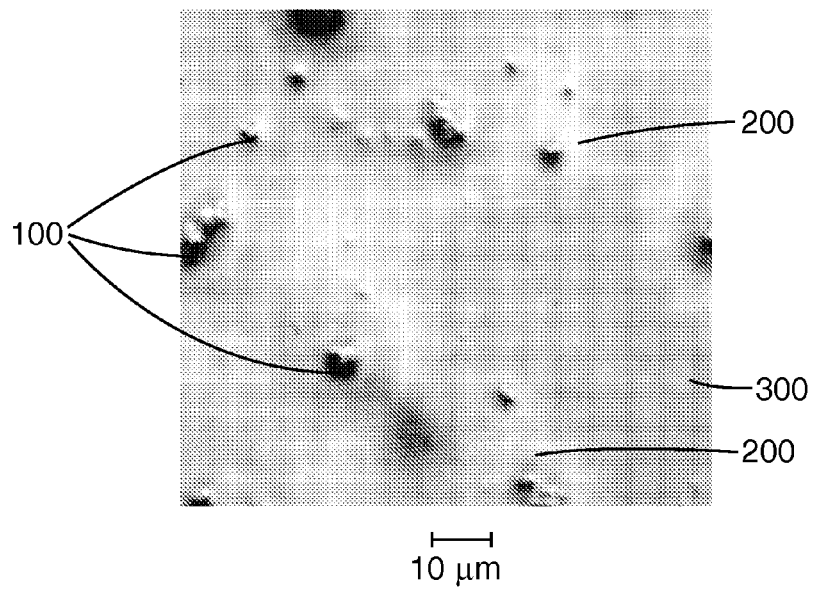
FIG. 5 is another illustrative antiglare surface at a magnification of 50×.
Figure 6:
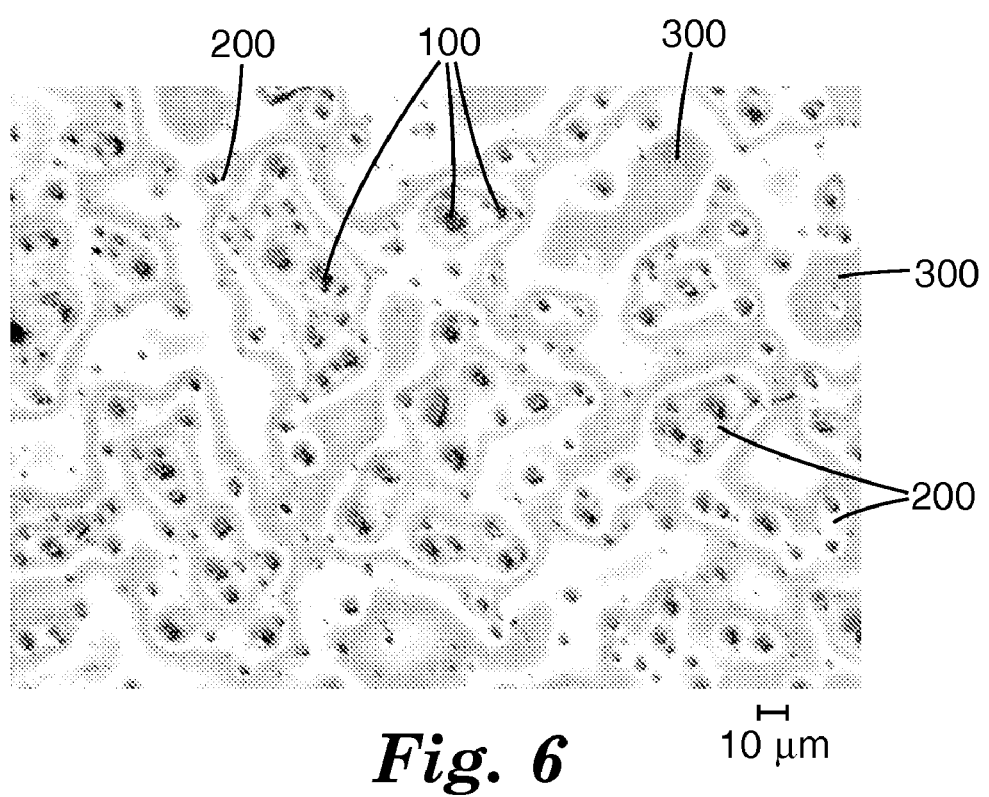
FIG. 6 is another illustrative antiglare surface at a magnification of 20×.

An exemplary antiglare surface layer, at a magnification of 50× and 20×, that was prepared from a coating comprising relatively large aggregates, is depicted in FIGS. 5 and 6 respectively. There is a combination of large surface structures (100) and comparatively smaller surface structures (200) typically surrounding the large surface structures. These structures are anchored by the cured inorganic polymer matrix. Relatively large surface structures can be advantageous for providing low levels of haze (i.e. 5% or less).

The average maximum dimension of the large structures is typically at least 10 micrometers. Further, the average maximum dimension of the large structures is typically less than 50 micrometers (e.g. less than 40 micrometers). The average size of the large structures, such as depicted in FIG. 6 is 25 micrometers. Further, 95% of the surface structures of FIG. 6 have a maximum dimension of less than 70 micrometers. The aspect ratio of these surface structures is at least about 1:1 and typically no more than about 5:1 and the structures are generally irregular in shape. The irregularity of these surface structures may be beneficial to the overall antiglare properties of the surface.

The individual large structures may have a single peak, the peak ranging in size from a single aggregate inorganic oxide particle (e.g. about 0.15 micrometers) to about 10 micrometers. It is common for such individual large structures to be generally shaped like a cone with the base anchored on the substrate by the inorganic polymer. Accordingly, there is a decreasing gradient of particles and/or particle aggregates spanning from the apex of the cone to the peripheral edges of the base of the cone. As depicted in FIG. 5, it is not uncommon for a single surface structure to comprise multiple neighboring peaks. For example, each surface structure may have two to ten distinct peaks. Each distinct peak may be greater than about 4 micrometers and may contain a number of aggregates less than 4 micrometers in size.

The individual large surface structures may be separated from the nearest large surface structures by a distance ranging from about 2 micrometers to about 50 micrometers. The majority of large surface structures are separated by a distance of about 15 micrometers on average.

As would be appreciated by one of ordinary skill in the art, the antiglare surface may comprise various combinations of relatively small inorganic oxide surface structures in combination with relatively large inorganic oxide surface structures. The surface area of the surface structures relative to the total surface area of the antiglare layer is typically at least about 20%. The surface area of the surface structures is typically no greater than about 60%. In at least some embodiments that provide low levels of haze, the surface area of the surface structures range from about 25% to 35% of the total surface area of the antiglare layer. In other embodiments, such as antiglare surface layers formed from relatively small inorganic oxide aggregates, the surface area of the surface structures ranges from about 40% to about 50%.

Figure 3:
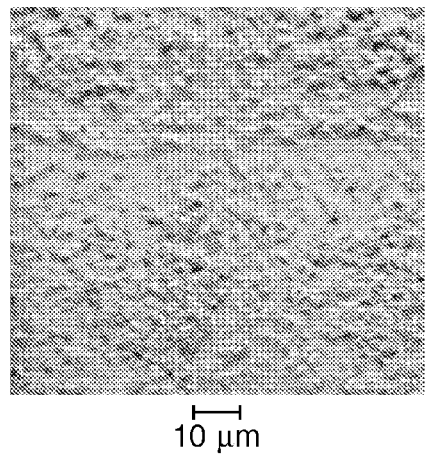
FIG. 3 is an illustrative antiglare surface at a magnification of 50×.

In some embodiments, such as in the case of relatively small surface structure regions as exemplified in FIG. 3, the surface structures are approximately evenly distributed. Hence the distance between surface structures, i.e. unstructured land portions (300) of the surface, has about the same dimensions as the size of the structures. In other embodiments, such as in the case of larger surface structures as exemplified in FIGS. 5 and 6, the surface area of the unstructured land portions between surface structures may be considerably larger.

The inorganic polymer preferably includes a source of silica that when sufficiently heated forms $SiO_2$.

The cured inorganic polymer matrix is preferably an organosilane solution cured by means of heat. Organosilane solutions are known in the art and are typically derived from a "sol-gel" process.

Organosilanes can be represented by the following general formula

 (Formula I)

wherein R is an organofunctional group bounded to the silicon atom; X is a hydrolyzable group, such as a halogen or an alkoxy group, attached to the silicon atom; n is 1 or 2; and m is 4-n.

A preferred organosilane solution is synthesized from the hydrolysis and condensation of silicon alkoxides. (See for example C. J. Brinker and G. W. Scherer, "Sol-Gel Science", Academic Press, 1990.) Such silanes have a molecular structure that is highly ordered. Preferred silicon alkoxides include for example tetraethoxysilane, methyltriethoxysilane, and mixtures thereof. Other suitable organosilanes are known in the art, such as described in EP 1 077 236.

A medium is typically used to dilute the organosilane as well as to transport the silane to the surface of the substrate being coated. Additionally, water reacts with organosilanes to form hydrolyzed products or silanols. Hydrolysis reactions between water and organosilanes can be catalyzed in an acidic solution. Thus, a stabilizing agent may be used so that the silanols are stable against self-condensation reactions that may cause precipitation of the solution if the solution is basic. The bond formed between the silanol and the substrate is accomplished through a cross condensation reaction. The cross condensation reaction between a silanol and a molecule on the substrate is generally slow. This reaction can be accelerated by heating.

The antiglare surface layer is typically prepared from an alcohol-containing coating composition. The aggregates can be formed by flocculating colloidal (e.g. silica) inorganic oxide from a colloidal (e.g. silica) inorganic oxide precursor dispersed in an organosilane solution. Accordingly, the flocculated particles are prepared concurrently with the preparation of the organosilane solution. Alternatively, however, the aggregates can be separately formed, optionally separated from the non-flocculated particles, and then added to a stable organosilane solution.

The method of preparing the antiglare coating generally involves preparing an organosilane solution (e.g. via sol-gel processes) including (e.g. silica) inorganic oxide particle precursor and destabilizing the composition in order to flocculate at least a portion of the inorganic oxide particles. Various methods of flocculating colloidal (e.g. silica) inorganic oxide particles are known such as described in "One step antiglare sol-gel coatings for screens by sol-gel techniques", Journal of Non-crystalline Solids 218 (1997) 163-168 and U.S. Pat. No. 5,998,013.

A preferred method of flocculation includes reacting colloidal (e.g. silica) inorganic oxide with at least one of several silicon alkoxide precursors to form a silane precursor and destabilizing the solution by addition of acid. A variety of acids can usefully be employed. Typically inorganic acids such as hydrochloric acid, nitric acid, and the like are utilized. The solution may further comprise an adhesion promoter, sintering aid or flux to improve coating densification during the curing step. Sodium acetate is a suitable additive. In the preparation thereof, the order of addition of these materials can vary. For example, the silicon alkoxide precursors can be dispersed in an alcohol solution, followed by (e.g. sequential) addition of the sintering aid and acid. This mixture can then be combined with the colloidal (e.g. silica) inorganic oxide solution. This order of addition is preferred for obtaining relatively large aggregates. Alternatively, the silicon alkoxide precursors can first be combined with the colloidal (e.g. silica) inorganic oxide solution, followed by the (e.g. sequential) addition of the acid, sintering aid, and alcohol.

In greater detail, an antiglare coating composition can be prepared by continuously stirring tetraethoxysiliane and methyltriethoxysilane with 100 nm colloidal silica in ethylene glycol. While stirring, a dilute acid/sodium acetate trihydrate mixture is added to destabilize the particle precursors and initiate flocculation particle growth of the particle precursor. The dilute acid also initiates and sustains hydrolysis and condensation reactions of the silicon alkoxide precursors by providing both the water of hydration and the acid catalyst. After the reaction is complete, a partially hydrolyzed ethyl silicate sol is yielded containing metastable silica floccules of about 0.5-150 μm. Alcohol diluents of 1-butanol and 2-propanol are then added to further stabilize the coating composition and adjust the viscosity as required for application. This method produces relatively large aggregates as previously described.

The (e.g. silica) inorganic oxide aggregates are formed from uniformly dispersed colloidal (e.g. silica) inorganic oxide in a hydrophilic solvent such as an alcohol. Examples of suitable solvents include 1-butanol, 2-propanol, ethanol, ethyl acetate, ethylene glycol, propylene glycol, acetone, and the like. The solvent may be used singly or as a combination of two or more types. The percent solids in the colloidal (e.g. silica) inorganic oxide dispersion is generally about 5-50% (preferably, about 15-30%), based on the total weight of the colloidal (e.g. silica) inorganic oxide dispersion. Colloidal silica is commercially available from various suppliers. Nyacol Nanotechnolgies, Inc. Ashland, Mass. and Alfa Aesar, Ward Hill, Mass. both supply alcohol based sols having a mean particle size ranging from 20 to 50 nm. One preferred colloidal silica is a 30% solution of 100 nm colloidal silica in ethylene glycol, commercially available from Nanotechnologies, Inc. under the trade designation "Nyacol DP5540".

Typically, small concentrations of colloidal (e.g. silica) inorganic oxide are employed. Preferably the concentration of colloidal (e.g. silica) inorganic oxide is less than 5 wt-% of the coating composition. More typically, the concentration of colloidal (e.g. silica) inorganic oxide is less than 4 wt-% and more preferably less than 3 wt-%. The Applicant has found that good antiglare properties can be obtained with coating compositions comprising less than 2 wt-% colloidal (e.g. silica) inorganic oxide. For this embodiment, it is preferred to employ colloidal (e.g. silics) inorganic oxide at concentration of 1.5 wt-% or less and even 1.0 wt-% and less. Relatively large surface structures, such as depicted in FIG. 5, can be obtained with less than 0.5%. Typically the concentration of colloidal silica in the coating compositions is at least 0.05%.

The coating compositions are generally stored in a closed container with stirring at room temperature for about 2 to 10 days prior to employing the coating composition to coat a substrate. The aggregate-containing organosilane coating solution is applied with a suitable method that yields a thin substantially uniform layer. Precision dip coating machines are a preferred means of coating due to their smooth motion at precise and accurate withdrawal speeds. When appropriately modified to the proper rheology, the coating compositions described herein can be applied by spray coating, meniscus coating, flow coating, screen printing, or roll coating.

The coating compositions described herein exhibit sufficient adhesion to a wide variety of substrates. Glass and (e.g. ceramic) materials are preferred substrates for illuminated display panel due to being both transparent and highly durable. The thickness of the glass substrate typically ranges from about 0.4 mm to about 4 mm. Soda lime glass and borosilicate glass are typically used for displays. The present invention is also suitable for improving the durability of antiglare coatings on various plastic substrates, such as polycarbonate, polymethylmethacrylate, or cellulose acetate butyrate.

Alternatively, the transparent substrate may be a plastic film. The thickness of the transparent substrate is generally at least 20 micrometers and often at least 50 micrometers. Further, the transparent substrate is often less than 500 micrometers, and more often less than 250 micrometers. The surface of the plastic film may be treated, where desirable, to increase adhesion of the antiglare layer. Examples of such a treatment include formation of roughness on the surface by sand blasting or with a solvent, and oxidation of the surface by corona discharge, treatment by chromic acid, treatment by flame, treatment by heated air, or irradiation by ultraviolet light in the presence of ozone.

For plastic substrates, an organosilane primer layer may be used to enhance the bonding between the (e.g. coated) substrate and the antiglare surface layer. Generally, an organosilane primer layer contains a very high concentration of hydroxyl groups and high angle Si—O—Si bonds. These are the bonding sites for the antiglare surface layer. Permanent bonding is formed by condensation reactions between the antiglare coating composition and the organosilane primer layer. The Si—O—Si bonds are extremely durable.

For glass substrates, a silicon oxide layer is preferably disposed between the substrate and the antiglare layer. Such silicon oxide layer is surmised to improve adhesion of the antiglare layer to the substrate. Further, the presence of the silicon oxide layer can also improve the durability of the antiglare layer and thus the article. For example a display article having such a silicon oxide layer present can exhibit at least a 25% increase in scratch resistance as determined by the Nanoscratch Test. For example, scratch resistances of at least 20 mN, at least 30 mN, or at least 40 mN have been obtained. The silicon oxide layer may be applied by various methods, including sputtering, evaporation, chemical vapor depositions and sol-gel methods. U.S. Pat. Nos. 5,935,716; 6,106,892 and 6,248,397 disclose deposition of silicon oxide on glass.

After coating the antiglare coating composition, the coated substrate is thermally cured to drive off solvents and form a dense three-dimensional film structure by thermally inducing self-condensation reactions within the coating material, which remove hydroxide groups from the remaining silanol molecules and bond the structure together with the underlying substrate. This can be accomplished in a batch process within an electrical resistance element or gas fired oven with total cycle times ranging from 1.5 to 3 hours duration. Durability is generally enhanced as a result of full densification. Although complete densification of the coating composition typically occurs at about 800° C., the curing temperature is chosen based on the heat resistance of the substrate.

A preferred method of curing an organosilane solution, particularly when applied to doped tin oxide coated glass, is described in U.S. Pat. No. 6,406,758, incorporated herein by reference. Such method involves a combination of heat and infrared radiation in a chamber equipped with infrared lamps or externally wound heater tubes emitting infrared radiation in the 2.5-6.0 micrometer wavelength spectrum. The use of infrared radiation introduces more energy into the coating while at the same time reducing the thermal exposure of the glass substrate. In doing so, the curing temperature can be reduced to less than about 550° C.

The thickness of the cured antiglare land layer (i.e. at the locations of the unstructured land) is typically at least 0.5 micrometers. Further the thickness of the antiglare land layer is typically not greater than 1.5 micrometers.

The antiglare layer may further comprise an antimicrobial layer disposed on the surface. A suitable antimicrobial layer is a liquid crystal silane having the general formula:

$$X_3Si(CH_2)_pZ \qquad \text{(Formula II)}$$

wherein p>1;

X is selected from the group Cl, Br, alkoxy, hydroxyl radicals, and mixtures thereof, that are hydrolyzable to form a silanol; and Z is a functional group selected from the group alkyl quaternary ammonium salts, alkyl sulfonium salts, alkyl phosphonium salts, substituted biphenyls, terphenyls, azoxybenzenes, cinnamates, pyridines, benzoates, and mixtures thereof.

Such liquid crystal silanes are commercially available from Dow Corning, Midland, Mich., under the trade designations "Dow Corning 5700" and "Dow Corning 5772". Such antimicrobial layers can provide additional scratch resistance.

Glare reducing transparent substrates (e.g. glass) are utilized in a wide array of applications such as cathode ray tube screens or other display devices (monitors, televisions, liquid crystal displays, etc.); input or selection devices such as touch screens or input panels; glass enclosed displays (museums or other public displays); optical filters; picture frames; windows for architectural applications; glass components employed in mirrors; solar collector cover plates; optical lenses utilized in eyewear and viewing devices; and windshields for vehicles.

Advantages of the invention are further illustrated by the following examples, but the particular materials and amounts thereof recited in the examples, as well as other conditions and details, should not be construed to unduly limit the invention. All percentages and ratios herein are by weight unless otherwise specified.

EXAMPLES

Test Methods

Polishing Wear Test

Coated glass was cut to 3 cm×4 cm rectangular samples. Edges and corners were sanded to minimize breakage. The samples were then washed thoroughly with water to remove particulate, then with isopropanol-based glass cleaner, and then soaked in acetone for 1 minute in order to remove residual water. The samples were then wiped clean using a lint-free cloth, allowed to air dry for 30 minutes, and then weighed (Mettler Toledo International Inc., Columbus, Ohio, P.N. AX205).

The samples were polished on the coated side of the glass for 30 minutes at 100% amplitude in 180 g sample holders. The polishing instrument was a Buehler VIBROMET 2 Polisher (Buehler LTD, Lake Bluff, Ill., P.N. 67-1635). The polishing cloth was Buehler Microcloth (Buehler LTD, Lake Bluff, Ill., P.N. 40-7222). The polishing media was a slurry of 50 g of 1.0 micrometer alumina powder in 1000 ml of deionized water (MICROPOLISH II, Buehler LTD, Lake Bluff, Ill., P.N. 40-6321-080). After 30 minutes of polishing at 100% amplitude, the samples were removed, washed in water, then isopropanol-based cleaner, and then acetone. The samples were then wiped with a lint-free cloth, air-dried for 30 minutes, and then reweighed.

After 120 minutes of polishing, the samples were left to polish until continuity could be made between two points at the surface. Using a multimeter, resistance was measured at two points 2 cm apart in the center of each coated glass sample.

Wear rate was calculated as the total weight lost over the course of 120 minutes of polishing time. Time to failure was the time at which continuity was made between two points 2 cm apart.

Nanoscratch

Nanoscratch resistance was measured using a Nanoscratch tester (CSM Instruments, Needham, Mass.). Testing was performed using a progressive scratch load increasing from 2 mN to 100 mN. A 2-micrometer spherical diamond indenter was used as the probe.

Abrasion Resistance

A Taber Abraser 5130 (Taber Industries, North Tonawanda, N.Y.,) was used to abrade the samples. Two CS-10F abrasive wheels (Taber Industries, North Tonawanda, N.Y.) were used that consist of $Al_2O_3$ particles embedded in rubber. Each wheel was weighted with 500 g and resurfaced with 150 grit sandpaper (Taber Industries, North Tonawanda, N.Y., P.N. ST-11). Abrasion was conducted for 100 cycles on the samples with the wheels being resurfaced for another 25 cycles on the sandpaper. Resistance was measured between the printed center point and surrounding ring before abrasion and after each set of 100 cycles.

Glass was printed with a thick film of silver paste in a test pattern consisting of two concentric rings surrounding the wear region created by the Abraser. The glass samples were then coated, fired, and cut into 5 inch (12.5 cm) squares. Failure is defined as a 25% increase in electrical resistance.

Transmission

The transmittance of the article was measured using a BYK Gardner Haze-Guard plus.

Transmitted Haze

The transmitted haze of the article was measured using a BYK Gardner Haze-Guard plus.

Clarity

Clarity of the optical articles was measured using a BYK Gardner Haze-Guard plus. The sample was positioned perpendicularly to the light source path. Clarity is calculated from the values of unscattered transmitted light and light scattered less than 2.5° from the incident beam, as measured by circle and ring photo detectors.

Reflected Haze

Reflected haze was measured with a BYK-Gardner Haze-Gloss Meter.

Reflectance

Reflectance was measured using a BYK-Gardner TCS II at 550 nm with specular reflection included.

Example 1

A 3 kg batch of an antiglare coating composition was prepared as follows: In a vessel equipped with a stirring paddle, 31.55 weight % tetraethoxysilane (Dynasil A, Sivento Corp.) was added to 17.99% methyltriethoxysilane (Dynasilan MTES, Sivento Corp.). Stirring was then started and continued throughout the mixing process. 0.53% DP5540 (Nyacol Corp) (30% 100 nm colloidal silica dispersed in ethylene glycol) was then added to the stirring mixture. After 10 minutes, a mixture of 9.67% 0.15M hydrochloric acid and 0.15% sodium acetate trihydrate was added to the above. After a 2½ hour reaction time, alcohol diluents were added. First, 20.06% 1-butanol, ACS, then, after 10 minutes, 20.05% of 2-propanol was added. The completed coating composition was kept stored under constant stirring. Before use, the coating composition was aged for 2½ days in a closed container at room temperature under constant stirring. The coating composition was then gravity filtered through a 25 µm mesh filter prior to coating.

Example 1 was coated onto two different substrates. The first substrate was soda lime glass. The second substrate was a display panel for a touch screen that was comprised of clean, soda lime glass plates with a fluorine-doped tin oxide transparent conductive coating disposed on one side a thin (i.e. less than 25 angstroms) layer of silicon oxide disposed on the conductive coating, and a thick film circuit, as described in U.S. Pat. No. 6,727,895, further disposed upon the silicon oxide layer. During heating the thick film circuit penetrates the silicon oxide layer such that electrical contact is made with the underlying conductive layer.

The coating was applied to either the glass or the silicon oxide layer of the display panel with a precision dip coating machine at a withdrawal speed set at 0.13 inches (0.33 cm) per second. A suitable precision dip coating machine is available from Chemat Technology, Northridge Inc, CA under the trade designation "Dip-Master 200". After the dip coating cycle was complete, a one-minute drying time was allowed to elapse before the coated substrates were removed from the dip coating machine enclosure. The coated substrates were then cured in an infrared curing oven as disclosed in U.S. Pat. No. 6,406,758.

An anti-scratch and anti-microbial treatment was then applied to the coated substrates by applying a homeotropic liquid crystal silane solution to the substrates and curing as disclosed in U.S. Pat. Nos. 6,504,582 and 6,504,583. Although the exemplified construction included such liquid silane surface layer, similar results were obtained without this layer (i.e. antiglare layer present on the surface).

The antiglare surface layer was viewed with a microscope at a magnification of 50× and 20×. The 50× magnification of the antiglare surface layer of Example 1 is depicted in FIG. 5, whereas the 20× magnification is depicted in FIG. 6. It was also confirmed by optical microscopy that the surface structures were composed of discrete silica particles and are therefore true aggregates.

The surface area fraction of the surface structures was determined to be 31% for Example 1 as determined using optical microscopy and image analysis Software (Image Pro Plus 4, Media Cybernetics).

The optical properties of the coated substrates in comparison to a control lacking the antiglare layer were evaluated. Table 1 as follows reports the average value for at least 3 samples and the standard deviation:

The durability properties of the coated substrates were evaluated. Table 2 as follows reports the average value for at least 3 samples and the standard deviation:

TABLE 2

| Coating Composition (Substrate) | Polishing Wear Test Time to Failure (min) | Nano Scratch (through top layer only) | Nano Scratch (through top layer and silicon oxide layer |
| --- | --- | --- | --- |
| Example 1 glass with transparent conductive coating | 255 ± 16 | 45 ± 5 mN | 60± mN |

What is claimed is:

1. A touch screen comprising an antiglare layer, an active layer underlying the antiglare layer, and a glass substrate underlying the active layer wherein the antiglare layer comprises aggregate inorganic oxide particles in a cured inorganic polymer matrix and the aggregate inorganic oxide particles form surface structures ranging in size from greater than 2 micrometers to about 100 micrometers.

2. The touch screen of claim 1 wherein the touch screen has a reflected haze of at least 150.

3. The touch screen of claim 1 wherein the touch screen has a reflectance of less than 10%.

4. The touch screen of claim 1 wherein the touch screen has a transmission of at least 80%.

5. The touch screen of claim 1 wherein the touch screen has a scratch resistance as determined by the Nanoscratch Test of at least 10 mN.

6. The touch screen of claim 1 wherein the touch screen has a time to failure as determined by the Polishing Test of at least 2 hours for a 1 micrometer antiglare land layer.

7. The touch screen of claim 1 wherein the inorganic oxide particles have a mean particle size ranging from about 0.05 micrometers to about 0.15 micrometers.

8. The touch screen of claim 1 wherein the surface structures have an average maximum dimension of at least about 10 micrometers.

9. The touch screen of claim 5 wherein the surface structures have an average maximum dimension of at least about 20 micrometers.

10. The touch screen of claim 1 wherein the inorganic oxide is selected from the group consisting of silica, ceria, alumina, zirconia, titania and mixtures thereof.

11. The touch screen of claim 1 wherein the inorganic particles consist of silica.

12. The touch screen of claim 1 wherein the cured inorganic polymer matrix is derived from an organosilane.

13. The touch screen of claim 12 wherein the cured inorganic polymer matrix is derived from silicon alkoxide.

TABLE 1

| Coating Composition (Substrate) | Transmission (%) | Haze | Clarity | Reflectance at 550 nm (%) | Reflected Haze |
| --- | --- | --- | --- | --- | --- |
| Control-glass with transparent conductive coatings but no antiglare coating | 86.5 ± 0.5% | 0.5 ± 0.1% | 100% | 11.4 ± 0.5 | 37 ± 3% |
| Example 1 (glass) | 91.5 ± 0.5 | 5 ± 1 | 85 ± 3 | 7.0 ± 0.5 | 470 ± 30 |

14. The touch screen of claim 11 wherein the organosilane is derived from a sol-gel process.

15. The touch screen of claim 1 wherein the surface layer has a total surface area and the surface structures comprise at least 20% of the total surface area.

16. The touch screen of claim 1 wherein the surface layer has a total surface area and the surface structures comprise at least 30% of the total surface area.

17. The touch screen of claim 1 wherein the surface layer has a total surface area and the surface structures comprise at least 40% of the total surface area.

18. The touch screen of claim 1, further comprising a silicon oxide layer disposed between the transparent conductive layer and the antiglare layer.

19. The touch screen of claim 1, wherein the active element comprises a transparent conductive layer disposed between the glass substrate and the antiglare layer.

20. The touch screen of claim 19, wherein the transparent conductive layer comprises a transparent conductive oxide.

21. The touch screen of claim 1 further comprising a liquid crystal silane surface layer.

22. An article comprising an antiglare layer wherein the antiglare layer comprises aggregate inorganic oxide particles in a cured inorganic polymer matrix, wherein the aggregate inorganic oxide particles form surface structures ranging in size from greater than 2 micrometers to about 100 micrometers.

23. The article of claim 22 wherein the article is a display panel.

24. The article of claim 22 wherein the article is selected from the group comprising computer monitors, television screens, optical filters, picture frames, windows, mirrors, solar collector cover plates, optical lenses, and windshields for vehicles.

25. A coating composition comprising a organosilane and flocculated inorganic oxide particles ranging in size from greater than 2 micrometers to about 100 micrometers.

26. The coating composition of claim 25 wherein the inorganic oxide particles are present in a concentration of less than 1.5 wt-%.

27. The article of claim 22 wherein the article has a transmitted haze of less than 30, transmission of at least 80%, clarity of at least 70, and a scratch resistance as determined by the Nanoscratch Test of at least 10 mN.

28. The article of claim 27 wherein the haze is less than 5%.

29. The article of claim 27 wherein the is at least 90%.

30. The article of claim 27 wherein the clarity is at least 80%.

* * * * *

UNITED STATES PATENT AND TRADEMARK OFFICE
CERTIFICATE OF CORRECTION

PATENT NO.         : 7,294,405 B2
APPLICATION NO. : 10/926722
DATED                  : November 13, 2007
INVENTOR(S)       : Paul J. Richter It is certified that error appears in the above-identified patent and that said Letters Patent is hereby corrected as shown below:

Cover Page
Column 2, line 6, Delete "Dervied" and insert -- Derived --, therefor.

Column 4
Line 37, After "starting" delete "5".

Column 14
Line 22, In Claim 29, After "the" insert -- transmission --, therefor.

Signed and Sealed this

Twenty-fourth Day of November, 2009

David J. Kappos
*Director of the United States Patent and Trademark Office*